United States Patent
Yamashita et al.

(10) Patent No.: US 11,377,824 B2
(45) Date of Patent: Jul. 5, 2022

(54) DISPLAY SYSTEM FOR WORK VEHICLE AND GENERATION METHOD

(71) Applicants: The University of Tokyo, Tokyo (JP); KOMATSU LTD., Tokyo (JP)

(72) Inventors: Atsushi Yamashita, Tokyo (JP); Soichiro Iwataki, Tokyo (JP); Hiromitsu Fujii, Tokyo (JP); Masataka Fuchida, Tokyo (JP); Alessandro Moro, Tokyo (JP); Hajime Asama, Tokyo (JP); Kazuki Kure, Tokyo (JP)

(73) Assignees: THE UNIVERSITY OF TOKYO, Tokyo (JP); KOMATSU LTD., Tokyo (JP)

( * ) Notice: Subject to any disclaimer, the term of this patent is extended or adjusted under 35 U.S.C. 154(b) by 0 days.

(21) Appl. No.: 16/640,154

(22) PCT Filed: Jan. 29, 2019

(86) PCT No.: PCT/JP2019/003013
§ 371 (c)(1),
(2) Date: Feb. 19, 2020

(87) PCT Pub. No.: WO2019/159687
PCT Pub. Date: Aug. 22, 2019

(65) Prior Publication Data
US 2021/0214922 A1 Jul. 15, 2021

(30) Foreign Application Priority Data
Feb. 19, 2018 (JP) .............................. JP2018-027202

(51) Int. Cl.
*H04N 13/302* (2018.01)
*H04N 13/122* (2018.01)
(Continued)

(52) U.S. Cl.
CPC ........... *E02F 9/261* (2013.01); *H04N 13/122* (2018.05); *H04N 13/275* (2018.05);
(Continued)

(58) Field of Classification Search
CPC ..... E02F 9/261; H04N 13/302; H04N 13/122; H04N 13/363; H04N 13/275; H04N 7/18;
(Continued)

(56) References Cited

U.S. PATENT DOCUMENTS 9,113,047 B2 * 8/2015 Onuma .................... G05B 9/02
9,639,958 B2 * 5/2017 Reiners .................. G06T 15/04
(Continued)

FOREIGN PATENT DOCUMENTS

| CN | 102448681 A | 5/2012 |
| CN | 103080427 A | 5/2013 |

(Continued)

OTHER PUBLICATIONS

The International Search Report for the corresponding international application No. PCT/JP2019/003013, dated Apr. 23, 2019.
(Continued)

*Primary Examiner* — Tung T Vo
(74) *Attorney, Agent, or Firm* — Global IP Counselors, LLP (57) ABSTRACT

The camera captures an image of a surrounding environment of a work vehicle and outputs image data indicative of the image. The shape sensor measures a three-dimensional shape of the surrounding environment and outputs 3D shape data indicative of the three-dimensional shape. A controller acquires the image data and the 3D shape data. The controller generates a three-dimensional projection model based on the 3D shape data. The three-dimensional projection model portrays the three-dimensional shape of the surrounding environment. The image is projected onto the three-
(Continued)

dimensional projection model based on the image data, thereby generating display image data that represents a display image of the surrounding environment of the work vehicle.

14 Claims, 10 Drawing Sheets

(51) Int. Cl.
  *E02F 9/26* (2006.01)
  *H04N 13/363* (2018.01)
  *H04N 13/275* (2018.01)
  *B60K 35/00* (2006.01)
(52) U.S. Cl.
  CPC ......... *H04N 13/302* (2018.05); *H04N 13/363* (2018.05); *B60K 35/00* (2013.01); *B60K 2370/1529* (2019.05); *B60Y 2200/411* (2013.01)
(58) Field of Classification Search
  CPC ............ B60K 2370/1529; B60K 35/00; B60Y 2200/411; G01B 11/24; G01C 15/00; G06T 7/521; G06T 7/70; G06T 17/05
  USPC .......................................................... 348/42
  See application file for complete search history.

(56) References Cited

U.S. PATENT DOCUMENTS

| | | | | |
|---|---|---|---|---|
| 9,824,490 | B1* | 11/2017 | Cote | E02F 9/261 |
| 2003/0004645 | A1* | 1/2003 | Kochi | H04N 13/194 702/1 |
| 2003/0147727 | A1* | 8/2003 | Fujishima | H04Q 9/10 414/200 |
| 2010/0245542 | A1* | 9/2010 | Kim | G01B 11/00 348/46 |
| 2011/0311127 | A1 | 12/2011 | Mizutani et al. | |
| 2013/0033494 | A1* | 2/2013 | Kiyota | B60R 1/00 345/420 |
| 2013/0158789 | A1 | 6/2013 | Seki | |
| 2013/0222573 | A1* | 8/2013 | Onuma | H04N 7/18 348/82 |
| 2014/0200863 | A1* | 7/2014 | Kamat | G06T 19/00 703/1 |
| 2015/0084755 | A1 | 3/2015 | Chen et al. | |
| 2015/0249821 | A1* | 9/2015 | Tanizumi | B66C 13/00 348/46 |
| 2016/0275696 | A1* | 9/2016 | Reiners | G06T 11/001 |
| 2016/0321763 | A1* | 11/2016 | Shike | G06Q 10/06313 |
| 2017/0050566 | A1 | 2/2017 | Yamashita et al. | |
| 2017/0067739 | A1 | 3/2017 | Siercks et al. | |
| 2017/0350692 | A1 | 12/2017 | Ohtomo et al. | |
| 2019/0352885 | A1* | 11/2019 | Kurokami | E02F 9/261 |
| 2020/0056346 | A1* | 2/2020 | Izumikawa | E02F 9/267 |
| 2020/0291614 | A1* | 9/2020 | Kiyota | E02F 9/261 |
| 2020/0325649 | A1* | 10/2020 | Tsukamoto | E02F 9/26 |

FOREIGN PATENT DOCUMENTS

| | | |
|---|---|---|
| CN | 105745122 A | 7/2016 |
| CN | 107655461 A | 2/2018 |
| JP | 2012-202063 A | 10/2012 |
| JP | 2012-233353 A | 11/2012 |
| JP | 2012-255286 A | 12/2012 |
| JP | 2013-36243 A | 2/2013 |
| JP | 2017-215240 A | 12/2017 |
| WO | 2016/031009 A1 | 3/2016 |

OTHER PUBLICATIONS

The Office Action for the corresponding Chinese application No. 201980004602.5, dated Jan. 6, 2021.
The Office Action for the corresponding Chinese application No. 201980004602.5, dated Jun. 3, 2021.

* cited by examiner

DISPLAY SYSTEM FOR WORK VEHICLE AND GENERATION METHOD

CROSS-REFERENCE TO RELATED APPLICATIONS

This application is a U.S. National stage application of International Application No. PCT/JP2019/003013, filed on Jan. 29, 2019. This U.S. National stage application claims priority under 35 U.S.C. § 119(a) to Japanese Patent Application No. 2018-027202, flied in Japan on Feb. 19, 2018, the entire contents of which are hereby incorporated herein by reference.

BACKGROUND

The present invention relates to a display system for a work vehicle and a generation method.

BACKGROUND INFORMATION

There is a technology in which the surroundings of a work vehicle are captured by a camera and a bird's-eye view image looking down from above the surroundings of the work vehicle is displayed on a display. For example, in the display system described in International Publication WO 2016-031009, a plurality of cameras mounted on a work vehicle acquire image data of the surrounding environment of the work vehicle. A controller of the display system generates a bird's-eye view image by mapping the acquired images onto a projection model in a hemispherical shape.

SUMMARY

In the aforementioned display system, the shape of the projection model is fixed as a hemispherical shape. As a result, it is difficult to understand the actual shape of the surrounding environment of the work vehicle from the bird's-eye view image. For example, the bottom surface of the projection model is always a flat plane. As a result, even if the ground surface surrounding the work vehicle has inclination or unevenness, an image capturing the inclination or unevenness is projected onto a flat projection plane. Consequently, it is not easy to see that the ground is inclined or uneven from the bird's-eye view image.

An object of the present invention is to generate a display image with which the shape of the surrounding environment of a work vehicle can be understood easily.

A display system for a work vehicle according to a first embodiment includes a camera, a shape sensor, and a controller. The camera captures an image of the surrounding environment of a work vehicle and outputs image data indicative of the image. The shape sensor measures a three-dimensional shape of the surrounding environment and outputs 3D shape data indicative of the three-dimensional shape. The controller acquires the image data and the 3D shape data. The controller generates a three-dimensional projection model based on the 3D shape data. The three-dimensional projection model portrays the three-dimensional shape of the surrounding environment. By projecting the image onto the three-dimensional projection model based on the image data, display image data is generated indicative of a display image of the surrounding environment of the work vehicle.

In the display system for the work vehicle according to the present embodiment, the three-dimensional shape of the surrounding environment of the work vehicle is measured by the shape sensor and the three-dimensional projection model is generated based on the measured three-dimensional shape. As a result, the three-dimensional projection model has a shape that is the same as or is similar to the actual shape of the surrounding environment of the work vehicle. Therefore, by projecting the image captured by the camera onto the three-dimensional projection model, a display image is generated in which the shape of the surrounding environment of the work vehicle can be understood easily.

A generation method according to another embodiment is a generation method executed by a controller for generating display image data indicative of a display image of a surrounding environment of a work vehicle, the method including the following processes. A first process involves acquiring image data indicative of an image of the surrounding environment of the work vehicle. A second process involves acquiring 3D shape data indicative of a three-dimensional shape of the surrounding environment. A third process involves generating a three-dimensional projection model which portrays the three-dimensional shape of the surrounding environment based on the 3D shape data. A fourth process involves generating display image data by projecting an image onto a three-dimensional projection model based on the image data.

In the generation method according to the present embodiment, the three-dimensional shape of the surrounding environment of the work vehicle is measured by a shape sensor and a three-dimensional projection model is generated based on the measured three-dimensional shape. As a result, the three-dimensional projection model has a shape that is the same as or similar to the actual shape of the surrounding environment of the work vehicle. Therefore, by projecting the image captured by the camera onto the three-dimensional projection model, a display image is generated in which the shape of the surrounding environment of the work vehicle can be understood easily.

Effect of the Invention

According to the present invention, a display image can be generated in which the shape of the surrounding environment of a work vehicle can be understood easily.

DESCRIPTION OF EMBODIMENTS

Figure 1:
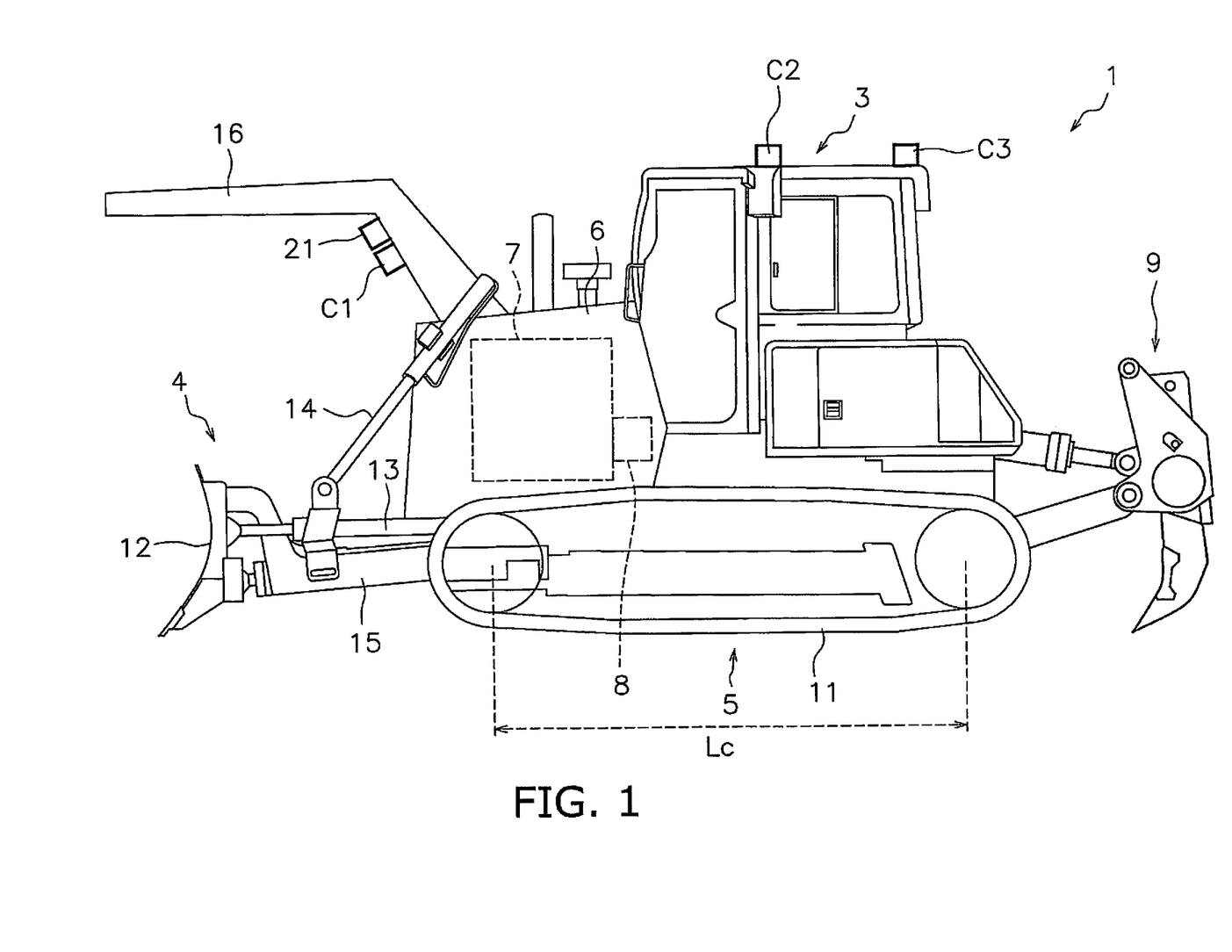
FIG. 1 illustrates a side view of a work vehicle according to an embodiment.

The following is a description of a display system for a work vehicle according to an embodiment with reference to the drawings. The display system according to the present embodiment is a system for displaying the work vehicle and the surrounding environment of the work vehicle. FIG. 1 is a side view of a work vehicle 1 according to an embodiment. The work vehicle 1 is a bulldozer according to the present embodiment. The work vehicle 1 includes a vehicle body 3, a work implement 4, and a travel device 5.

The vehicle body 3 includes the engine room 6. An engine 7 and a driving device such as a hydraulic pump and the like are disposed inside the engine room 6. A ripper device 9 is attached to a rear portion of the vehicle body 3.

The travel device 5 is a device for causing the work vehicle 1 to travel. The travel device 5 includes a pair of crawler belts 11 which are disposed on one side and the other side in the transverse direction of the work vehicle 1. The crawler belts 11 are each formed by a loop-shaped chain that extends in the longitudinal direction of the work vehicle 1. The work vehicle 1 travels due to the crawler belts 11 being driven.

The work implement 4 is disposed in front of the vehicle body 3. The work implement 4 is used for work, such as excavating, earth moving, or ground leveling. The work implement 4 includes a blade 12, tilt cylinders 13, lift cylinders 14, and arms 15. The blade 12 is supported on the vehicle body 3 via the arms 15. The blade 12 is provided in a manner that allows for pivoting in the up-down direction. The tilt cylinders 13 and the lift cylinders 14 are driven by hydraulic fluid from a hydraulic pump 8 and change the attitude of the blade 12.

Figure 2:
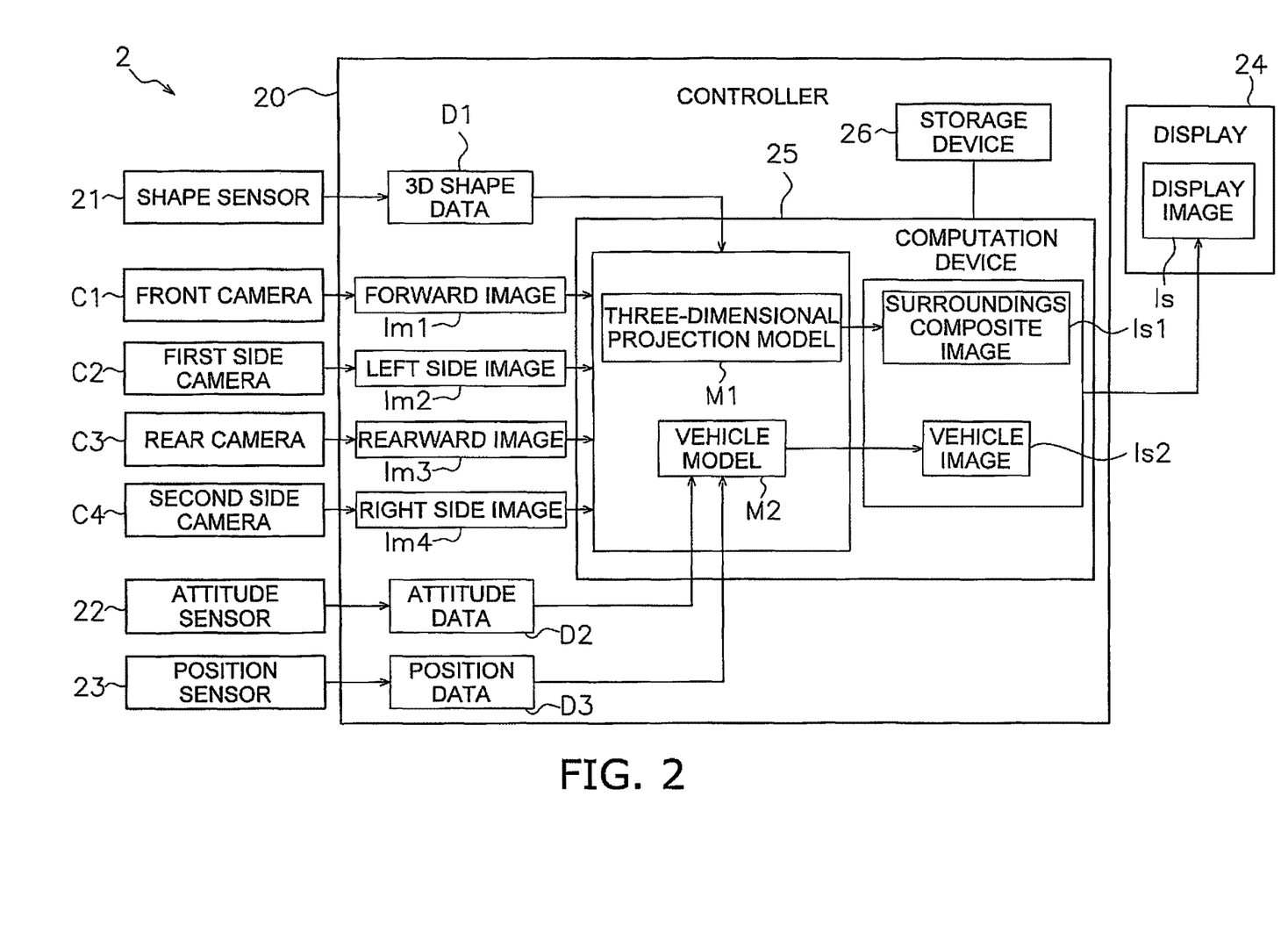
FIG. 2 illustrates a configuration of a display system according to a first embodiment.

FIG. 2 is a block diagram illustrating a configuration of a display system 2 and a processing flow of the display system 2 according to a first embodiment. As illustrated in FIG. 2, the display system 20 includes a plurality of cameras C1 to C4. The plurality of cameras C1 to C4 are attached to the vehicle body 3. The plurality of cameras C1 to C4 are fish-eye lens cameras. The angle of view of each of the plurality of cameras C1 to C4 is 180 degrees. However, the angle of view of each of the plurality of cameras C1 to C4 may be less than 180 degrees. Alternatively, the angle of view of each of the plurality of cameras C1 to C4 may be more than 180 degrees. The plurality of cameras C1 to C4 includes a front camera C1, a first side camera C2, rear camera C3, and a second side camera C4.

As Illustrated in FIG. 1, the front camera C1 is attached to a front portion of the vehicle body 3. Specifically, the vehicle body 3 includes a front camera support portion 16 as illustrated in FIG. 1. The front camera support portion 16 extends upward and forward from the front portion of the vehicle body 3. The front camera C1 is attached to the front camera support portion 16. The rear camera C3 is attached to a rear portion of the vehicle body 3.

The first side camera C2 is attached to one side of the vehicle body 3. The second side camera C4 is attached to the other side of the vehicle body 3. In the present embodiment, the first side camera C2 is attached to the left side of the vehicle body 3 and the second side camera C4 is attached to the right side of the vehicle body 3. However, the first side camera C2 may be attached to the right side of the vehicle body 3 and the second side camera C4 may be attached to the left side of the vehicle body 3.

The front camera C1 captures images in front of the vehicle body 3 and acquires images Including the surrounding environment of the work vehicle 1. The rear camera C3 captures images to the rear of the vehicle body 3 and acquires images including the surrounding environment of the work vehicle 1. The first side camera C2 captures images to the left of the vehicle body 3 and acquires images including the surrounding environment of the work vehicle 1. The second side camera C4 captures images to the right of the vehicle body 3 and acquires images including the surrounding environment of the work vehicle 1. The cameras C1 to C4 output image data indicative of the acquired images.

As illustrated in FIG. 2, the display system 2 includes a controller 20, a shape sensor 21, an attitude sensor 22, a position sensor 23, and a display 24. The shape sensor 21 measures a three-dimensional shape of the surrounding environment of the work vehicle 1 and outputs 3D shape data D1 indicative of the three-dimensional shape. The shape sensor 21 measures positions at a plurality of points on the surrounding environment of the work vehicle 1. The 3D shape data D1 represents the positions of the plurality of points on the surrounding environment of the work vehicle 1. The surrounding environment of the work vehicle 1 includes, for example, the ground surface around the work vehicle 1. That is, the 3D shape data D1 Includes the positions of a plurality of points on the ground surface around the work vehicle 1. In particular, the 3D shape data D1 Includes the positions of a plurality of points on the ground surface in front of the work vehicle 1.

Specifically, the shape sensor 21 measures the distances from the work vehicle 1 of the positions of the plurality of points on the surrounding environment. The positions of the plurality of points are derived from the distances of the plurality of points from the work vehicle 1. In the present embodiment, the shape sensor 21 is a laser imaging detection and ranging (LIDAR) device. The shape sensor 21 measures the distance to a measurement point by emitting a laser and measuring the reflected light thereof.

The shape sensor 21 includes, for example, a plurality of laser distance measuring elements aligned in the vertical direction. The shape sensor 21 measures the positions of the plurality of points at a predetermined cycle while rotating the plurality of laser distance measuring elements in the transverse direction around an axis that extends in the vertical direction. Therefore, the shape sensor 21 measures the distances to the points on the surrounding environment at fixed rotation angles and acquires the position of a three-dimensional point group.

The shape data includes, for each point, information about which element was used for the measurement, information about which rotation angle was used in the measurement, and information about the positional relationships between each element. In addition, the controller 20 has information indicative of the positional relationships between each element and the work vehicle 1. Therefore, the controller 20 can acquire the positional relationships between the points on the surrounding environment and the work vehicle from the shape data.

The attitude sensor 22 detects the attitude of the work vehicle 1 and outputs attitude data D2 indicative of the attitude. The attitude sensor 22 is, for example, an inertial measurement unit (IMU). The attitude data D2 includes the angle (pitch angle) relative to horizontal in the vehicle front-back direction and the angle (roll angle) relative to horizontal in the vehicle transverse direction. The IMU outputs the attitude data D2.

The position sensor 23 is, for example, a global navigation satellite system (GNSS) receiver. The GNSS receiver s, for example, a reception device for a global positioning system (GPS). The GNSS receiver receives a positioning signal from a satellite and acquires position data D3, indicative of the positional coordinates of the work vehicle 1, from the positioning signal. The GNSS receiver outputs the position data D3.

The shape sensor 21 is, for example, attached to the front camera support portion 16. Alternatively, the shape sensor 21 may be attached to another portion of the vehicle body 3. The attitude sensor 22 and the position sensor 23 are attached to the vehicle body 3. Alternatively, the positional sensor 23 may be attached to the work implement 4.

The controller 20 is connected to the cameras C1 to C4 so as to enable wired or wireless communication. The controller 20 receives the image data from the cameras C1 to C4. The controller 20 is connected to the shape sensor 21, the attitude sensor 22, and the position sensor 23 so as to enable wired or wireless communication. The controller 20 receives the 3D shape data D1 from the shape sensor 21. The controller 20 receives the attitude data D2 from the attitude sensor 22. The controller 20 receives the position data D3 from the position sensor 23.

The controller 20 is programmed so as to generate a display image Is for displaying the surrounding environment of the work vehicle 1, based on the aforementioned image data, the 3D shape data D1, the attitude data D2, and the position data D3. The controller 20 may be disposed outside of the work vehicle 1. Alternatively, the controller 20 may be disposed inside the work vehicle 1. The controller 20 includes a computation device 25 and a storage device 26.

The computation device 25 is configured by a processor, such as a CPU. The computation device 25 performs processing for generating the display image Is. The storage device 26 is configured by a memory, such as a RAM or a ROM, or by an auxiliary storage device 26, such as a hard disk. The storage device 26 stores data and programs used for generating the display image Is.

The display 24 is a device, such as a CRT, and LCD, or an OELD. However, the display 24 is not limited to the aforementioned displays and may be another type of display. The display 24 displays the display image Is based on an output signal from the controller 20.

The generation of the display image Is will be explained in greater detail next. First, imaging is performed by the cameras C1 to C4. The controller 20 acquires a forward image Im1, a left side image Im2, a rearward image Im3, and a right side image Im4 from the respective cameras C1 to C4. The forward image Im1 is an image in the forward direction of the vehicle body 3. The left side image Im2 is an image to the left of the vehicle body 3. The rearward image Im3 is an image in the rearward direction of the vehicle body 3. The right side image Im4 is an image to the right of the vehicle body 3.

Figure 3:
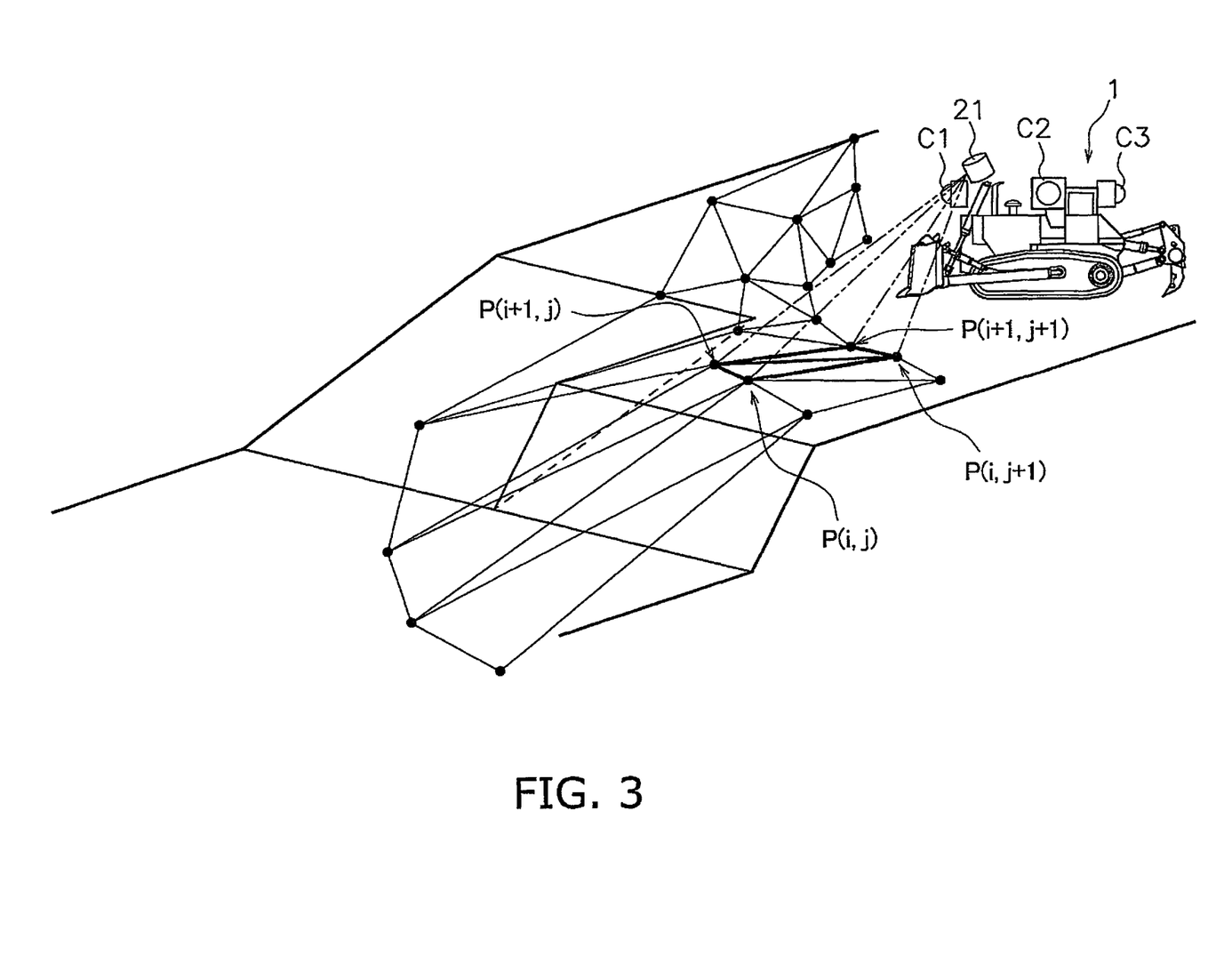
FIG. 3 is a view for explaining 3D shape data acquired by a shape sensor.

The controller 20 generates a three-dimensional projection model M1 based on the 3D shape data D1 acquired from the shape sensor 21. As illustrated in FIG. 3, the controller 20 generates, based on the positions of the plurality of points on the surrounding environment of the work vehicle 1, a polygon mesh which portrays the shape of the surrounding environment. The three-dimensional projection model M1 Includes polygons formed by linking adjacent points among the plurality of points.

Specifically, as illustrated in FIG. 3, the controller 20 generates a mesh that is formed by linking adjacent points among the plurality of points P(1,1), P(2,1), . . . , P(i,j), . . . measured in one scan by the shape sensor 21. In this case, P(i,j) represents a point measured by the respective ith laser distance measuring element in the vertical direction and obtained at the jth rotation angle in the transverse direction. The controller 20 generates the triangle (P(i,j), P(i+1,j), P(i,j+1)) and the triangle (P(i+1,j), P(i,j+1), P(i+1,j+)) for the points P(i,j), P(i+1,j), P(i,j+1), P(i+1,j+). As a result, the controller 20 generates the three-dimensional projection model M1 represented by triangular polygons.

The shape sensor 21 periodically measures the three-dimensional shape of the surrounding environment. The controller 20 updates the 3D shape data D1 and generates the three-dimensional projection model M1 based on the updated 3D shape data D1.

The controller 20 generates a surroundings composite image Is1 from the images Im1 to Im4 acquired by the respective cameras C1 to C4. The surroundings composite image Isi is an image which shows the surroundings of the work vehicle 1 in a bird's-eye view manner. The controller 20 generates the surroundings composite image Is1 by projecting the images Im1 to Im4 acquired by the respective cameras C1 to C4 on the three-dimensional projection model M1 by texture mapping.

In addition, the controller 20 combines a vehicle image Is2 indicative of the work vehicle 1 with the display image Is. The vehicle image Is2 is an image representing the work vehicle 1 itself in a three-dimensional manner. The controller 20 determines the attitude of the vehicle image Is2 on the display image Is from the attitude data D2. The controller 20 determines the orientation of the vehicle image Is2 on the display image Is from the position data D3. The controller 20 combines the vehicle image Is2 with the display image Is so that the attitude and orientation of the vehicle image Is2 on the display image Is coincides with the actual attitude and orientation of the work vehicle 1.

The controller 20 may generate the vehicle image Is2 from the images Im1 to Im4 acquired from the respective cameras C1 to C4. For example, portions of the work vehicle 1 are included in each of the images acquired from the cameras C1 to C4, and the controller 20 may generate the vehicle image Is2 by projecting the portions in the images onto a vehicle model M2. The vehicle model M2 is a projection model that has the shape of the work vehicle 1 and is stored in the storage device 26. Alternatively, the vehicle image Is2 may be an existing image that was captured in advance, or a three-dimensional computer graphics image created in advance.

Figure 4:
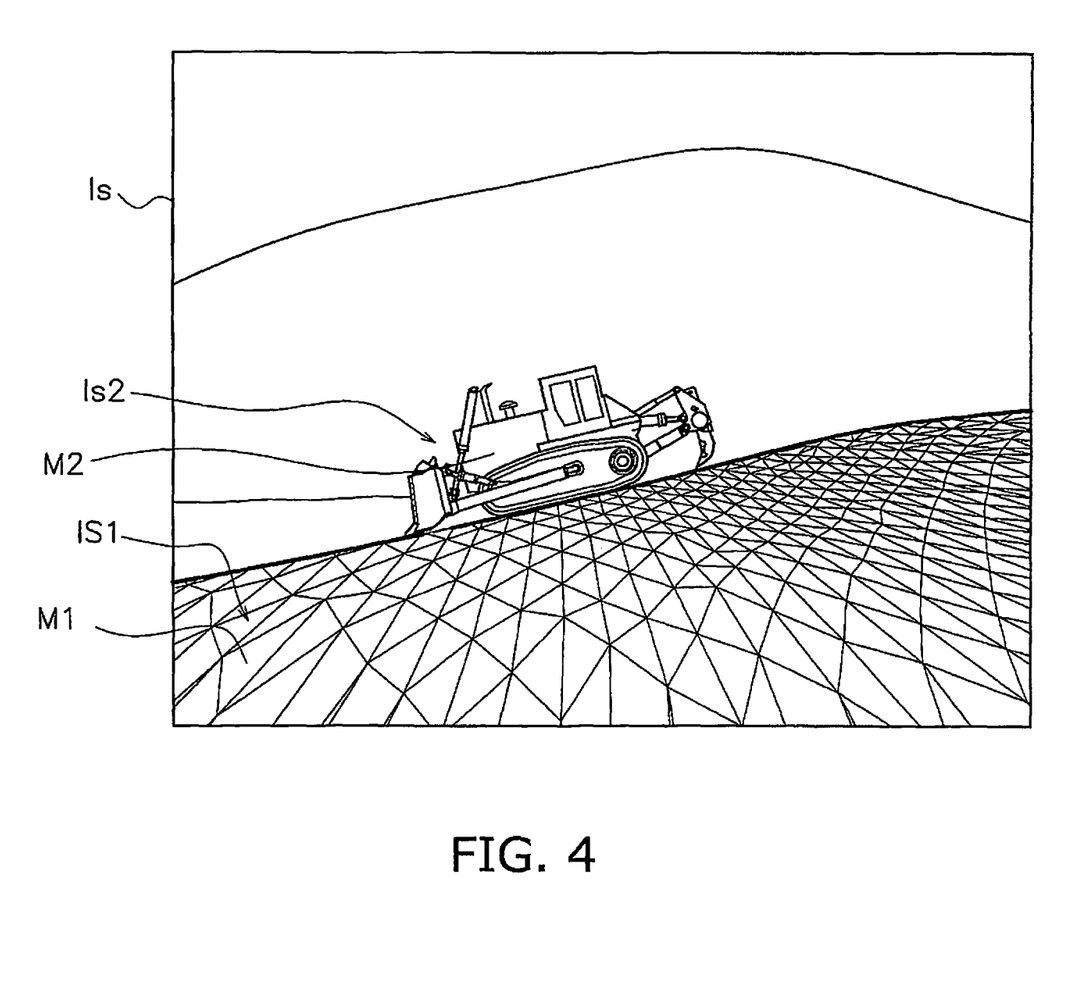
FIG. 4 illustrates an example of a display image according to the first embodiment.

The display 24 displays the display image Is. FIG. 4 illustrates an example of the display image Is. As illustrated in FIG. 4, the display image Is is an image that represents the work vehicle 1 and the surroundings thereof in a three-dimensional manner. As illustrated in FIG. 4, the display image Is is displayed by using the three-dimensional projection model M1 having an inclined shape that matches the actual inclined topography around the work vehicle 1. In addition, the display image Is is displayed while the vehicle image Is2 is inclined so as to match the actual inclined attitude of the work vehicle 1.

The display image Is is updated in real time and displayed as a moving image. Therefore, when the work vehicle 1 is traveling, the surroundings composite image Is1, the attitudes, orientations, and positions of the vehicle image Is2 in the display image Is are changed in real time and displayed in response to changes in the surrounding environment, the attitudes, orientations, and positions of the work vehicle.

In order to portray the changes in the attitude, orientation and position of the work vehicle 1, the three-dimensional projection model M1 and the vehicle model M2 are rotated in accordance with a rotating matrix that represents changes from the attitude, orientation, and position when the work vehicle 1 began to travel, and are translated in accordance with a translation vector. The rotation vector and the translation vector are acquired from the aforementioned attitude data D2 and the position data D3.

With regard to the specific method for combining the images, a method represented, for example, in "Spatiotemporal bird's-eye view images using multiple fish-eye cameras," (Proceedings of the 2013 IEEE/SICE international Symposium on System Integration, pp. 753-758, 2013) may be used, or a method represented in "Visualization of the surrounding environment and operational portion in a 3DCG model for the teleoperation of construction machines," (Proceedings of the 2015 IEEE/SICE International Symposium on System Integration, pp. 81-87, 2015) may be used.

In FIG. 4, the display image Is is an image viewing the work vehicle 1 and the surroundings thereof from the left side. However, the controller 20 is able to switch the display image Is to images of the work vehicle 1 and the surroundings thereof from the front, the rear, the right side, from above, or from an angle in any of the directions.

In the display system 2 according to the present embodiment as explained above, the three-dimensional shape of the surrounding environment of the work vehicle 1 is measured by the shape sensor 21 and the three-dimensional projection model M1 is generated based on the measured three-dimensional shape. As a result, the three-dimensional projection model M1 has a shape that is the same as or similar to the actual topography around the work vehicle 1. Therefore, the image of the surrounding environment can be presented in the display image Is in a shape that reflects the actual topography around the work vehicle 1. Therefore, in the display system 2 according to the present embodiment, the display image Is can be generated in which the shape of the surrounding environment of the work vehicle 1 can be understood easily.

In addition, the actual attitude of the work vehicle 1 is measured by the attitude sensor 22 and the vehicle image Is2 is displayed in the display image Is so as to match the measured attitude. As a result, the vehicle image Is2 can be presented in the display image Is in the attitude that reflects the actual attitude of the work vehicle 1. Consequently, a change in the attitude of the work vehicle 1, such as a situation in which the work vehicle 1 has advanced into an inclined surface or performed a turn, can be presented accurately to an operator.

Next, the display system 2 according to the second embodiment will be explained. In the display system 2 according to the second embodiment, the controller 20 evaluates a plurality of regions included in the surrounding environment based on the 3D shape data D1. In the present embodiment, the controller 20 defines each triangular polygon of the aforementioned three-dimensional projection model M1 as one region. The configuration of the display system 2 and the generation method of the display image Is are the same as those of the first embodiment and explanations thereof are omitted.

The controller 20 sorts the regions into a plurality of levels and evaluates the regions. In the present embodiment, the controller 20 sorts the regions into a first level and a second level. The first level indicates that the regions are ones in which the entry of the work vehicle 1 is permitted. The second level indicates that the regions are ones which the entry of the work vehicle 1 is prohibited.

Figure 5:
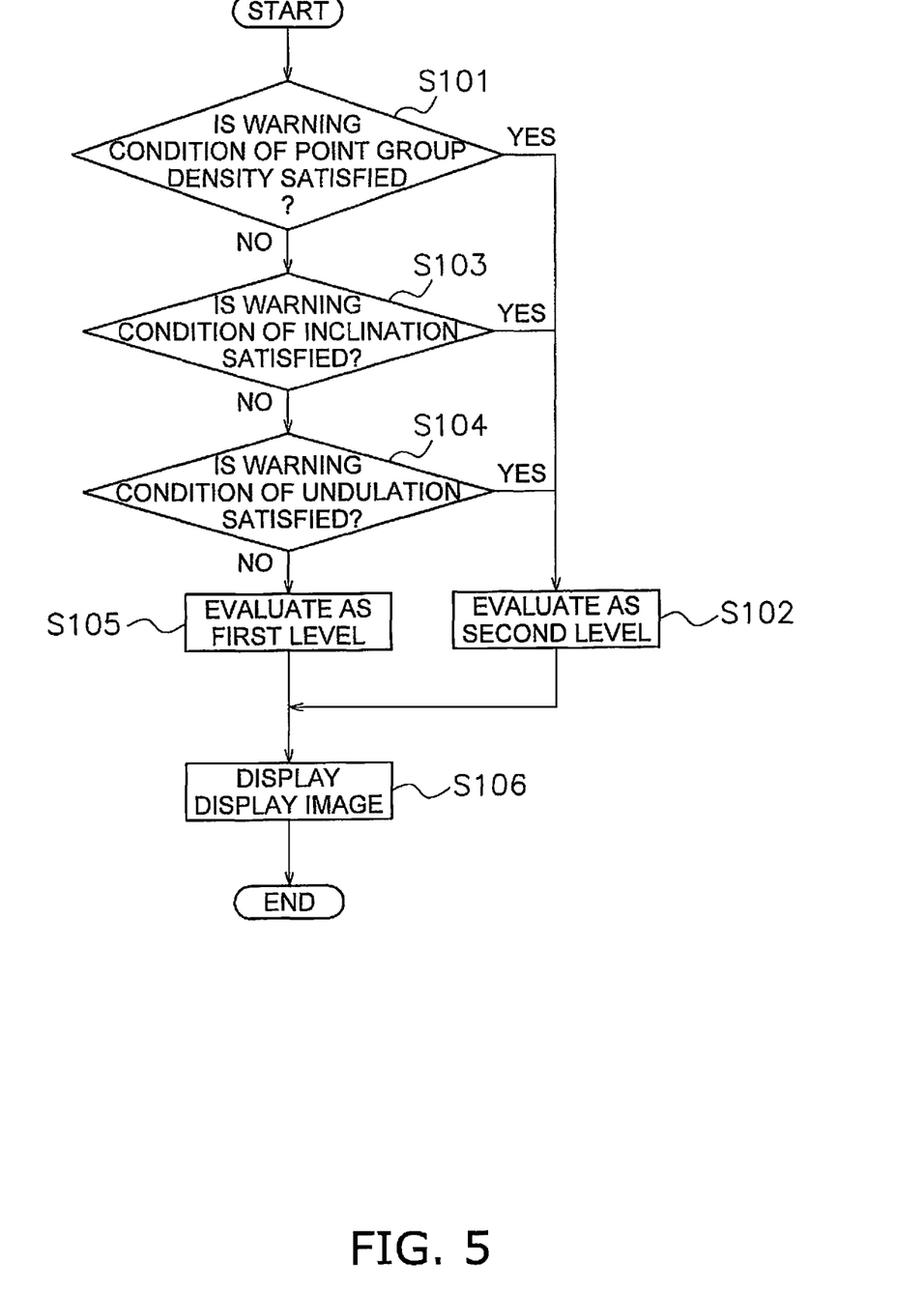
FIG. 5 is a flow chart illustrating processing executed by a controller of the display system according to a second embodiment

FIG. 5 is a flow chart illustrating processing performed by the controller 20 for evaluating a region. In step S101, the controller 20 determines whether a warning condition of a point group density is satisfied in each region. The warning condition of the point group density is represented by formula (1) below.

$$\max(L1(i), L2(i), L3(n)) > k \times Lc \qquad (1)$$

Figure 6:
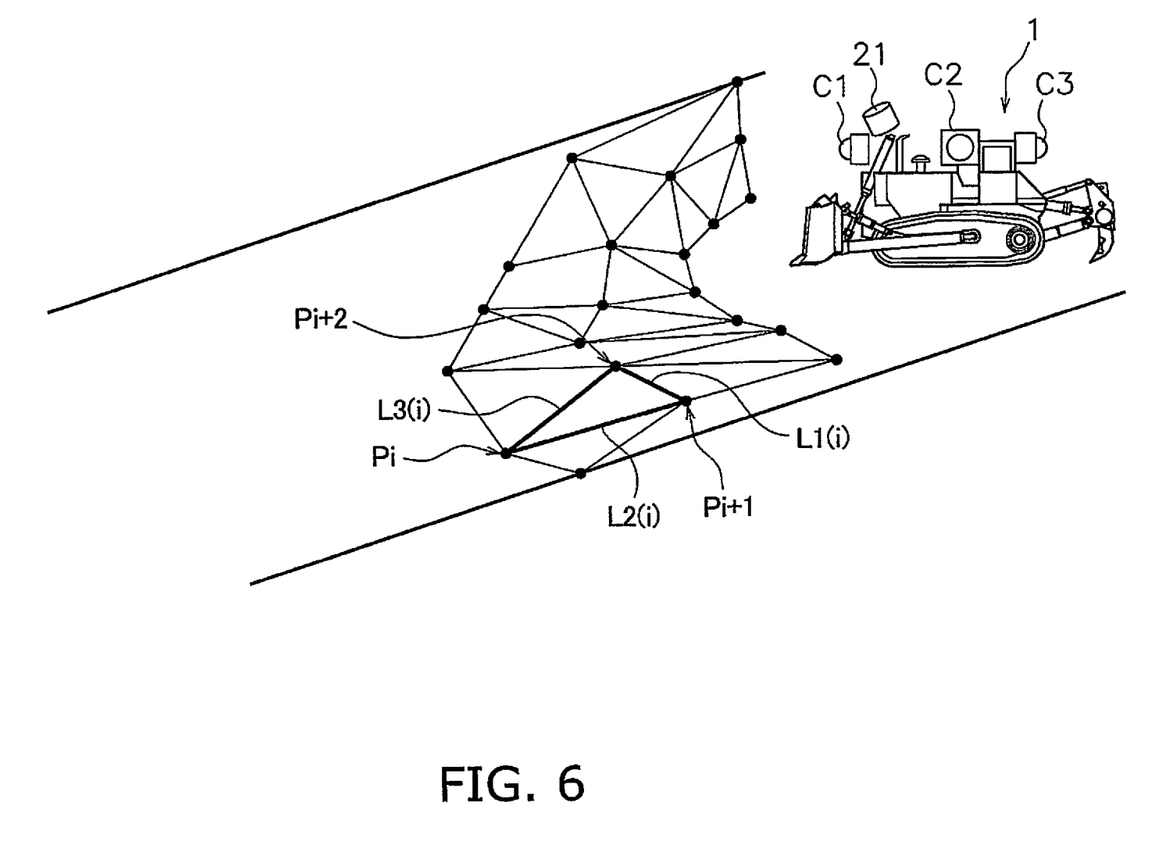
FIG. 6 is a view for explaining a warning condition of a point group density.

L1(i), L2(i), and L3(i) are the lengths of the line portions that link the points which define each region. As illustrated in FIG. 6, the controller 20 calculates the lengths L1(i), L2(i), and L3(i) on each side of the triangle (Pi, Pi+1, Pi+2) indicative of each region, as the lengths of the line portions in each region.

That is, the controller 20 compares the lengths of the line portions of each region (Pi, Pi+1, Pi+2) with a predetermined threshold k×Lc and determines whether each region (Pi, Pi+1, Pi+2) includes any line portion greater than the threshold k×Lc. When a given region (Pi, Pi+1, Pi+2) satisfies the warning condition of the point group density, that is, a given region (Pi, Pi+1, Pi+2) includes a line portion greater than the threshold k×Lc, the controller 20 determines the applicable region (Pi, Pi+1, Pi+2) as a second level region in step S102.

As illustrated in FIG. 1, "Lc" is the length of the crawler belt 11. The length of the crawler belt 11 is the length that the crawler belt placed on flat ground touches the flat ground and is referred to as the contact length. "k" is a predetermined coefficient that is greater than zero and smaller than one. Therefore, the threshold k×Lc is defined based on the length of the crawler belt 11. For example, the coefficient "k" may be ½. However, the coefficient "k" may be a value different from ½. The coefficient "k" may be a fixed value or may be a value that can be set arbitrarily by the operator. The length Lc of the crawler belt 11 may be a length associated with the contact length. For example, the length Lc may be the entire length of the crawler belt 11 in the front-back direction. In the above case, the value of the coefficient k is modified as appropriate. The warning condition of the point group density may further include the condition represented by the following formula (2).

$$\max(L1(i), L2(i), L3(i)) > k' \times Lc' \qquad (2)$$

In this case, Lc' is the center-to-center distance of the left and right crawler belts 11, and is referred to as the crawler belt gauge width. The coefficient k' is approximately 1. The controller 20 may determine that the warning condition is satisfied when both formula (1) and formula (2) are satisfied.

When a given region (Pi, Pi+1, Pi+2) does not satisfy the warning condition of the point group density, that is, when a given region (Pi, Pi+1, Pi+2) does not include a line portion greater than the threshold k×Lc, the processing advances to step S103.

In step S103, the controller 20 determines whether a warning condition of inclination is satisfied in a region in which the warning condition of the point group density is not satisfied. The warning condition of inclination is represented by the following formula (3).

$$\cos^{-1}(Nav \cdot e_z) > \theta_{max} \qquad (3)$$

Figure 7:
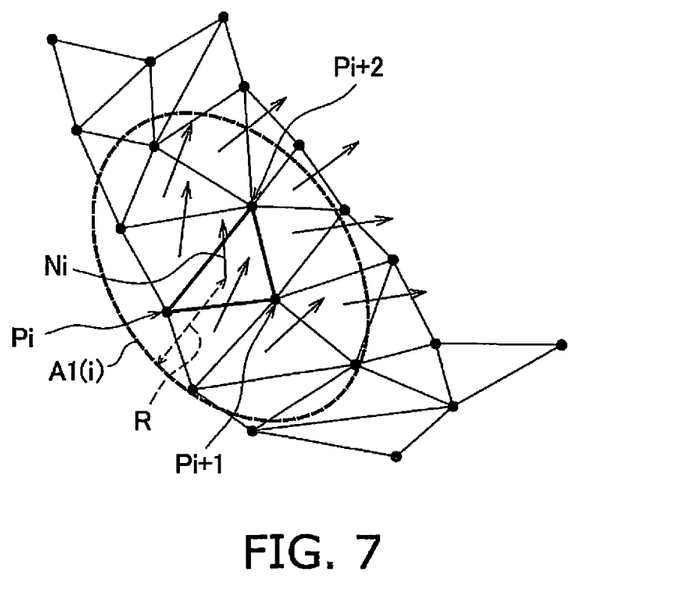
FIG. 7 is a view for explaining a warning condition of inclination.

In this case, as illustrated in FIG. 7, the controller 20 derives normal vectors Ni included in the subject region (Pi, Pi+1, Pi+2) and in a prescribed range A1(i) around the subject region, and calculates an average Nav of the normal vectors of the regions. The controller 20 determined angles formed by the average Nav of the normal vectors and gravitational force directions as inclination angles of the subject region (Pi, Pi+1, Pi+2). The aforementioned warning condition of inclination signifies that the inclination angle of the subject region (Pi, Pi+1, Pi+2) exceeds a threshold θmax. In formula (3), $e_z$ is a unit vector in the gravitational force direction.

The threshold θmax is, for example, an upper limit inclination angle for which entry of the work vehicle 1 is permitted. However, the threshold θmax may be another value. The threshold θmax may be a fixed value or may be set arbitrarily by the operator. The predetermined range A1(i) is represented by a circle with the radius R centered on the centroid of the subject region (Pi, Pi+1, Pi+2). The radius R may be a fixed value. Alternatively, the radius R may be arbitrarily set by the operator.

When a given region (Pi, Pi+1, Pi+2) satisfies the warning condition of inclination, that is, when the inclination angle of the given region (Pi, Pi+1, Pi+2) is greater than the threshold θmax, the controller 20 determines the applicable region (Pi, Pi+1, Pi+2) as the second level region in step S102. When the given region (Pi, Pi+1, Pi+2) does not satisfy the warning condition of inclination, that is, when the inclination angle of the given region (Pi, Pi+1, Pi+2) is equal to or less than the threshold θmax, the processing advances to step S104.

Figure 8:
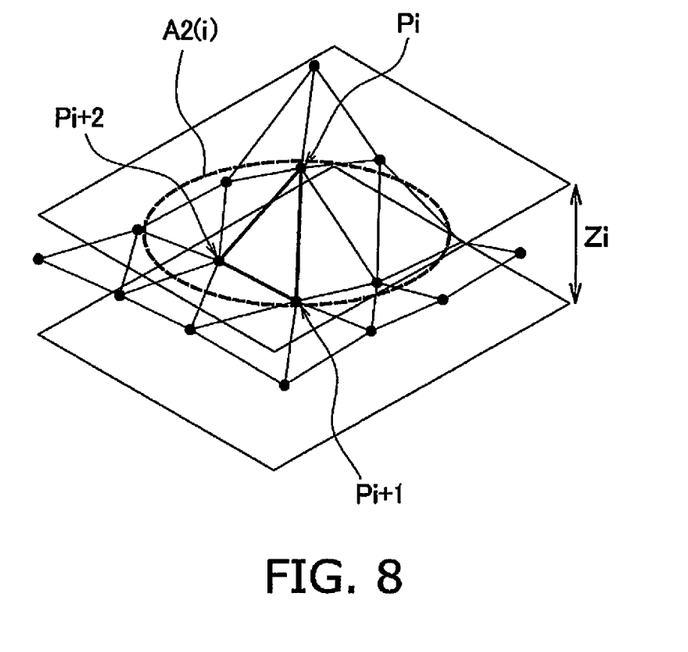
FIG. 8 is a view for explaining a warning condition of undulation.

In step S104, the controller 20 determines whether a warning condition of undulation is satisfied in a region in which the warning condition of the point group density is not satisfied. The warning condition of undulation is represented by the following formula (4).

$$\sigma_z^2 = \frac{1}{n}\sum (Z_i - Zav)^2 > \sigma_{max}^2 \quad (4)$$

n is the number of points included within the subject determination range A2(i) as illustrated in FIG. 8. The determination range A2(i) in this case may be the same as the predetermined range A1(l) in step S103, or may be different. Zi is the height of a point Pi in the gravitational force direction. Zav is the average of the heights of the points included in the determination range A2(i). $\sigma^2 z$ represents the dispersion of the points within the determination range A2(i). The aforementioned warning condition of undulation signifies that the dispersion $\sigma^2 z$ of the heights of the points within the subject determination range A2(i) exceeds a threshold $\sigma^2 max$. That is, the warning condition of undulation signifies that changes in the undulation of the determination range A2(l) are large.

The threshold $\sigma^2 max$ is, for example, an upper limit of the changes in undulation for which entry of the work vehicle 1 is permitted. However, the threshold $\sigma^2 max$ may be another value. The threshold $\sigma^2 max$ may be a fixed value or may be a value set arbitrarily by the operator.

When the warning condition of undulation of a given determination range A2(i) is satisfied, the controller 20 determines that the region included in the applicable determination range A2(i) is a second level region in step S102. When a given determination range A2(i) does not satisfy the warning condition of undulation, the processing advances to step S105.

In step S105, the controller 20 determines that the region in which none of the warning condition of the point group density, the warning condition of inclination, and the warning condition of undulation are satisfied is a first level region.

Next, the controller 20 displays the display image Is on the display 24. The controller 20 displays each of a plurality of regions in a mode in accordance with the evaluation in the display image Is. Specifically, the controller 20 displays the second level regions and the first level regions is different colors.

Figure 9:
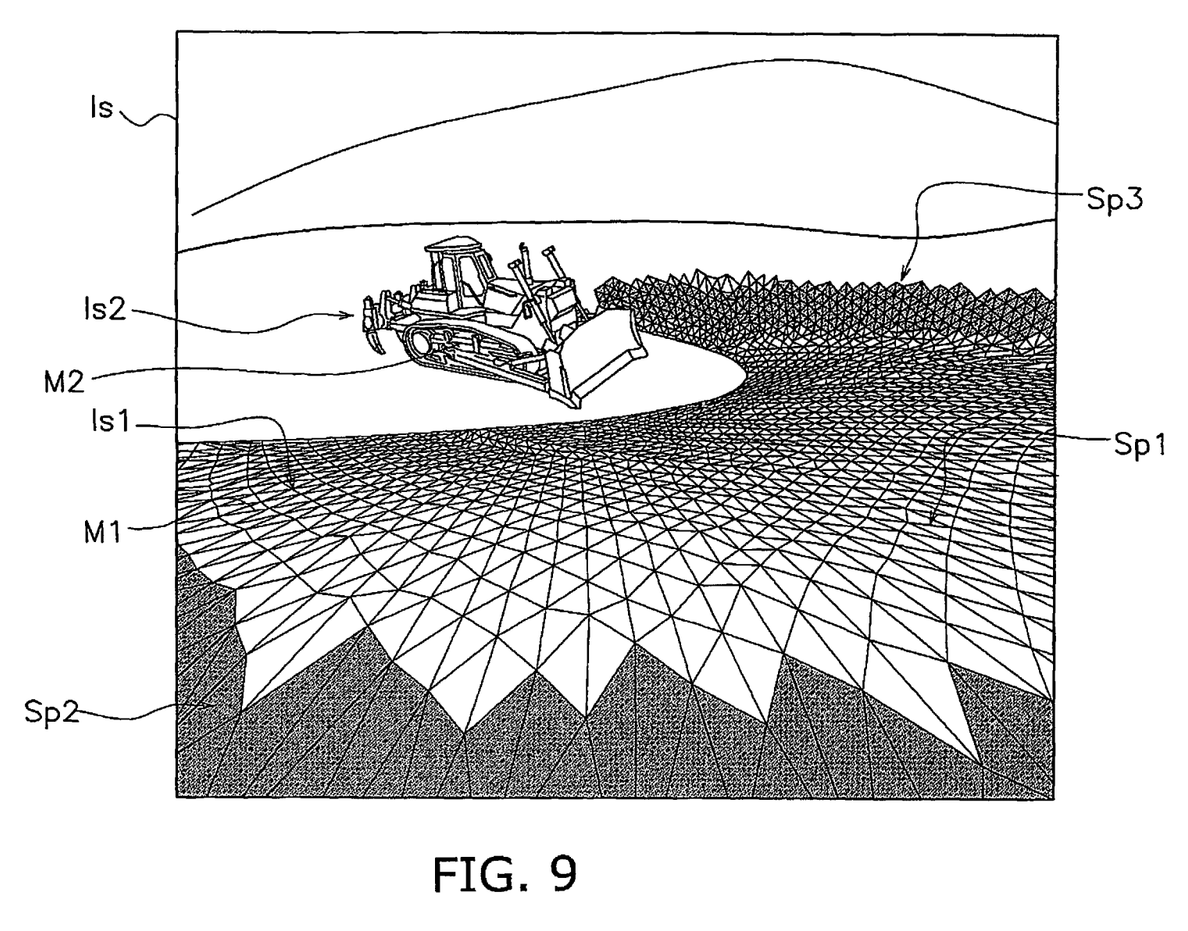
FIG. 9 illustrates an example of a display image according to the second embodiment.

FIG. 9 illustrates an example of the display image Is according to the second embodiment. In the display image Is illustrated in FIG. 9, a sharp downward slope Sp2 is present to the right of the work vehicle 1. A sharp upward slope Sp3 is present to the left of the work vehicle 1.

The controller 20 determines that the region Sp1 in front of the work vehicle 1 is a first level region. In addition, the controller 20 determines that the sharp downward slope Sp2 to the right and the sharp upward slope Sp3 to the left are second level regions. The controller 20 portrays the sharp downward slope Sp2 to the right and the sharp upward slope Sp3 to the left with a color different from the front region Sp1 in the display image Is.

In the display system 2 according to the second embodiment explained above, the controller 20 evaluates a plurality of regions included in the surrounding environment based on the 3D shape data D1, and displays the second level regions and the first level regions in different modes in the display image Is. As a result, the operator is able to easily notice the presence of the second level regions with the display image Is. In addition, the display image Is is projected onto the three-dimensional projection model M1 that reflects the actual topography around the work vehicle 1. As a result, the regions evaluated as second level regions can be portrayed in the display image Is in shapes approximating the actual topography.

Figure 10A:
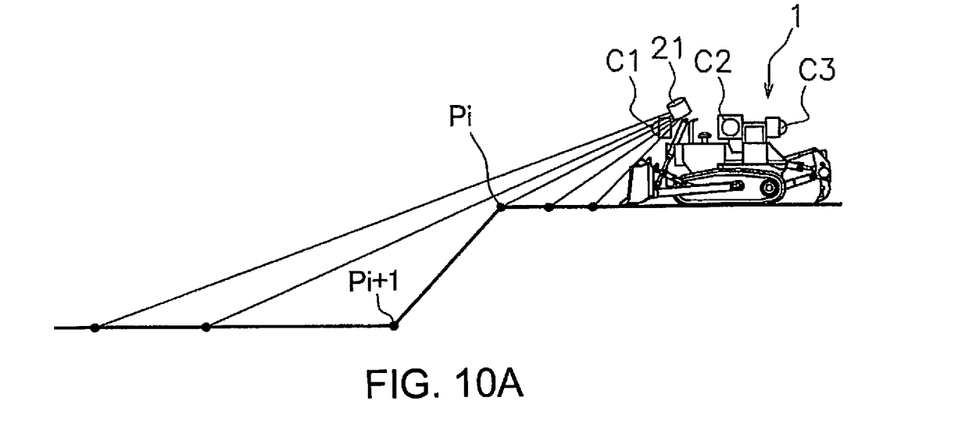
FIGS. 10A-10C are views of examples of topographies evaluated by the display system.

The controller 20 determines a region in which the warning condition of the point group density is satisfied as a second level region and displays the second level region in the display image Is in a mode that is different from the first level region. The ranges between each point are portions that are not measured by the shape sensor 21. This signifies that as the lengths of the line portions L1(i), L2(i), and L3(l) in each region grow longer, the ranges not measured by the shape sensor 21 become larger. As a result, as illustrated in FIG. 10A, there may be a region that cannot be measured with the shape sensor 21 if a sharp inclination is present between points Pi and Pi+1.

In the display system 2 according to the present embodiment, when at least one of the lengths among the lengths L1(i), L2(i), and L3(i) of the line portions is greater than the threshold k×Lc in a given region, the region is determined as a second level region. As a result, a region in which a sufficient density of a point group is not obtained can be determined as a second level region. Therefore, a region in which a sufficient density of the point group is not obtained because the shape sensor 231 is spaced far away from the region, can be determined as a second level region. Alternatively, a region in which an accurate topography cannot be measured because the lasers are blocked by the topography, can be determined as a second level region.

The threshold k×Lc is prescribed from the length of the crawler belt 11. If a region that cannot be measured is longer than the threshold k×Lc prescribed from the length of the crawler belt 11, there is a possibility that the inclination of the work vehicle 1 could exceed the upper limit inclination angle θmax when a depression is present in the region. In the display system 2 according to the present embodiment, such a region can be determined as a second level region, and can be displayed on the display image Is in a mode that is different from the first level regions.

Figure 10B:
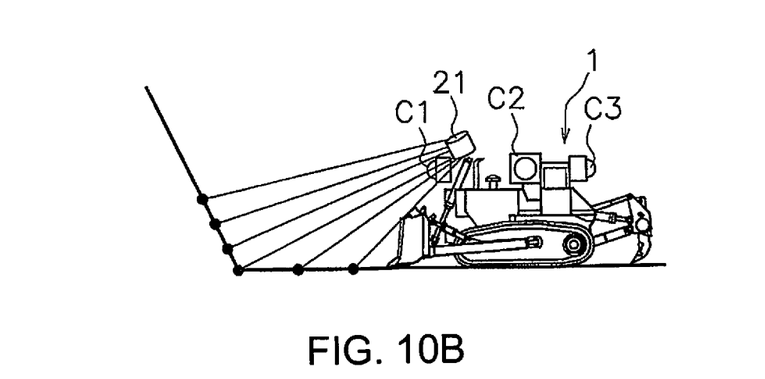

The controller 20 determines that a region in which the warning condition of inclination is satisfied as a second level region, and displays the region in the display image Is in a mode different from the first level regions. As a result, as illustrated in FIG. 10B for example, a region including a sharp inclination that exceeds the upper limit inclination angle θmax permitted for the work vehicle 1 is determined as a second level region, and can be displayed on the display image Is in a mode different from the first level regions.

The controller 20 evaluates a subject region not only with the inclination angle of the region to be determined, but also with an average of the combined inclination angles of other regions included in the predetermined range A1(i) that surrounds the area. Consequently, the effect of changes in the point group density due to the distance from the shape sensor 21 or the topography can be mitigated and the evaluation can be performed with precision.

Figure 10C:
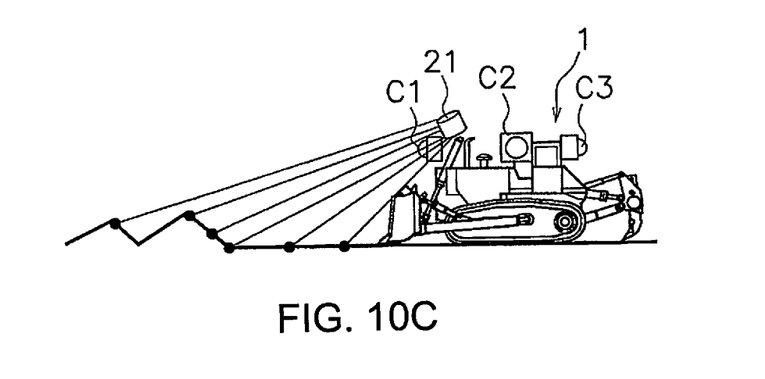

The controller 20 determines the determination region A2(i) in which the warning condition of undulation is satisfied as a second level region, and displays the region in the display image Is in a mode different from a region determined as a first level region. In a topography with large undulation, changes in the heights of the points included in the topography are severe. As a result, the controller 20 evaluates the severity of the undulations in a given determination range A2(i) based on the dispersion of the heights of the points in said determination range A2(i). Consequently, as illustrated in FIG. 10C for example, the controller 20 determines a region in which the undulation is large as a second level region, and displays the region on the display image Is in a mode different from the first level regions.

The display image Is illustrated in FIG. 9 is a video image generated from a point of view seen from the forward right of the work vehicle 1. However, the display image Is may be generated by changing the point of view as desired. For example, the controller 20 may switch the point of view in response to an operation by the operator. Consequently, the display image Is can be generated so that a portion that the operator particularly desires to see within the surrounding environment of the work vehicle 1 can be seen.

While embodiments of the present invention have been described above, the present invention is not limited to the embodiments and the following modifications may be made within the scope of the present invention.

Figure 11:
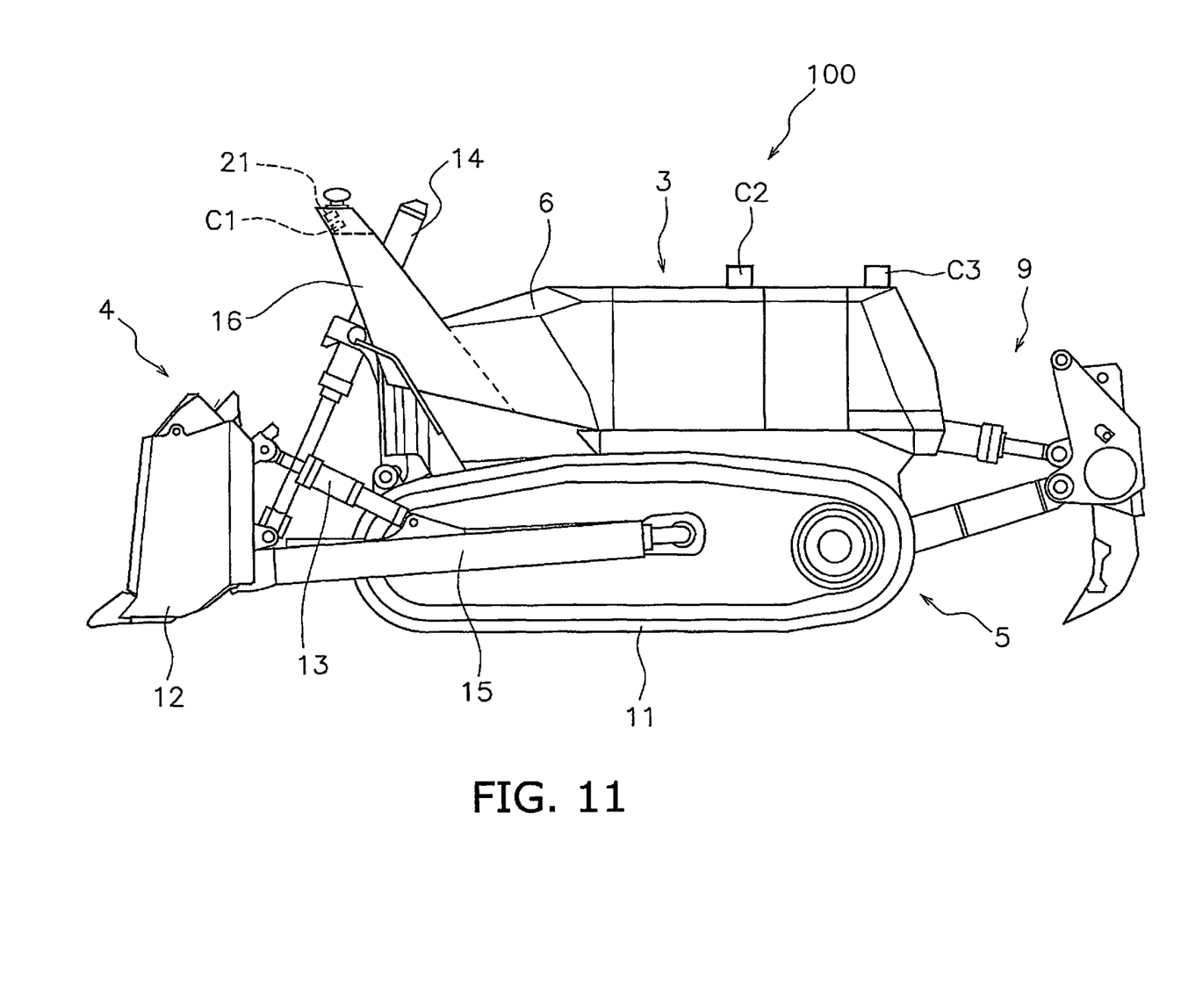
FIG. 11 is a side view of a work vehicle according to another embodiment.

The work vehicle 1I is not limited to a bulldozer, and may be another type of work vehicle, such as a wheel loader, a hydraulic excavator, and a dump truck and the like. The work vehicle 1 may be a vehicle operated remotely by the controller 20 disposed outside of the work vehicle 1. In this case, an operating cabin may be omitted from the vehicle body 3 as in a work vehicle 100 illustrated in FIG. 11. In FIG. 11, the same reference symbols are applied to the portions that correspond to the work vehicle 1 illustrated in FIG. 1. Alternatively, the work vehicle 1 may be a vehicle operated directly by an operator inside an operating cabin mounted on the work vehicle 1.

The number of the cameras is not limited to four and may be three or less or five or more. The cameras are not limited to fish-eye lens cameras and may be a different type of camera. The dispositions of the cameras are not limited to the dispositions indicated in the above embodiments and may be disposed differently.

The attitude sensor 22 is not limited to an IMU and may be another type of sensor. The positional sensor 23 is not limited to a GNSS receiver and may be another sensor. The shape sensor 21 is not limited to a LIDAR device and may be another measuring device such as a radar.

A portion of the warning conditions may be omitted or changed in the second embodiment. Alternatively, another warning condition may be added. The contents of the warning conditions may be changed. The evaluation of the regions is not limited to the two levels including the first level and the second level, but an evaluation with more levels may be performed.

According to the present invention, a display image can be generated in which the shape of the surrounding environment of a work vehicle can be understood easily.

What is claimed is:

1. A display system for a work vehicle, the display system comprising:
   a camera that captures an image of a surrounding environment of the work vehicle and outputs image data indicative of the image, the surrounding environment including a ground surface;
   a shape sensor that measures a three-dimensional shape of the surrounding environment and outputs 3D shape data indicative of the three-dimensional shape; and
   a controller that acquires the image data and the 3D shape data, the controller being configured to
      generate a three-dimensional projection model that portrays the three-dimensional shape of the surrounding environment based on the 3D shape data,
      generate display image data indicative of a display image of the surrounding environment of the work vehicle by projecting the image onto the three-dimensional projection model based on the image data,
      perform an evaluation whether each of a plurality of regions included in the surrounding environment based on the 3D shape data satisfies a predetermined warning condition, and
      display each of the plurality of regions in the display image in a mode that corresponds to the evaluation, each of the plurality of regions satisfying the predetermined warning condition being displayed differently from each of the plurality of regions not satisfying the predetermined condition.

2. The display system for a work vehicle according to claim 1, wherein the shape sensor measures positions of a plurality of points on the surrounding environment, and
   the 3D shape data represents the positions of the plurality of points.

3. The display system for a work vehicle according to claim 2, wherein
   the three-dimensional projection model includes a polygon that is formed by linking adjacent points among the plurality of points.

4. The display system for a work vehicle according to claim 1, wherein
   the shape sensor performs a periodical measuring of the three-dimensional shape of the surrounding environment, and
   the controller is further configured to
      update the 3D shape data accompanying the periodical measuring, and
      generate the three-dimensional projection model based on the updated 3D shape data.

5. The display system for a work vehicle according to claim 1, further comprising
an attitude sensor that detects an attitude of the work vehicle and outputs attitude data indicative of the attitude,
the controller being further configured to
acquire the attitude data,
combine a vehicle image indicative of the work vehicle with the display image, and
change the attitude of the vehicle image on the display image in accordance with the attitude data.

6. The display system for a work vehicle according to claim 1, wherein
the controller is further configured to
acquire an inclination angle of each of the plurality of regions, and
evaluate each of the plurality of regions based on the inclination angles.

7. The display system for a work vehicle according to claim 1, wherein
the controller is further configured to
compare a predetermined threshold to each of the inclination angles of the plurality of regions, and
display a region having an inclination angle equal to or less than the threshold and a region having an inclination angle greater than the threshold in different modes in the display image.

8. The display system for a work vehicle according to claim 1, wherein
the controller is further configured to
calculate an average of the inclination angle of a subject region among the plurality of regions and the inclination angle of another region included in a prescribed range around the subject region, and
evaluate the subject region based on the average of the inclination angles.

9. The display system for a work vehicle according to claim 1, wherein
the controller is further configured to
acquire heights of a plurality of points included in each of the plurality of regions,
calculate a dispersion of the heights of the plurality of points, and
evaluate each of the plurality of regions based on the dispersion.

10. The display system for a work vehicle according to claim 9, wherein
the controller is further configured to
compare a predetermined threshold and the dispersion, and
display a region in which the dispersion is equal to or less than the threshold and a region in which the dispersion is greater than the threshold with different modes in the display image.

11. The display system for a work vehicle according to claim 1, wherein
the shape sensor measures positions of a plurality of points on the surrounding environment, and
the 3D shape data represents the positions of the plurality of points, and
the controller is further configured to
define a plurality of regions surrounded by line portions that link the plurality of points based on the 3D shape data,
calculate lengths of the line portions for each of the plurality of regions,
evaluate each of the plurality of regions based on the lengths of the line portions, and
display each of the plurality of regions in a mode that corresponds to the results of the evaluations in the display image.

12. The display system for a work vehicle according to claim 11, wherein
the controller is further configured to
compare the lengths of the line portions with a predetermined threshold, and
display a region that includes one of the line portions greater than the threshold and a region that does not include one of the line portions greater than the threshold in different modes in the display image.

13. The display system for a work vehicle according to claim 12, wherein
the work vehicle includes a crawler belt, and
the threshold is prescribed based on the length of the crawler belt.

14. A generation method executed by a controller for generating display image data indicative of a display image of a surrounding environment of a work vehicle, the method comprising:
acquiring image data indicative of an image of the surrounding environment of the work vehicle, the surrounding environment including a ground surface;
acquiring 3D shape data indicative of a three-dimensional shape of the surrounding environment;
generating a three-dimensional projection model portraying the three-dimensional shape in the surrounding environment based on the 3D shape data;
generating the display image data by projecting the image onto the three-dimensional projection model based on the image data;
performing an evaluation whether each of a plurality of regions included in the surrounding environment based on the 3D shape data satisfies a predetermined warning condition, and
displaying each of the plurality of regions in the display image in a mode that corresponds to the evaluation, each of the plurality of regions satisfying the predetermined warning condition being displayed differently from each of the plurality of regions not satisfying the predetermined condition.

* * * * *